United States Patent [19]
Allen

[11] 3,830,465
[45] Aug. 20, 1974

[54] BALL VALVE
[75] Inventor: Herbert Allen, Houston, Tex.
[73] Assignee: Cameron Iron Works, Inc., Houston, Tex.
[22] Filed: Sept. 14, 1972
[21] Appl. No.: 288,904

Related U.S. Application Data
[60] Division of Ser. No. 181,354, Sept. 17, 1971, abandoned, which is a continuation-in-part of Ser. No. 148,699, June 1, 1971, abandoned.

[52] U.S. Cl. .............................................. 251/360
[51] Int. Cl. ............................................. F16k 5/20
[58] Field of Search ........... 251/360, 361, 362, 364, 251/357, 315; 137/315

[56] References Cited
UNITED STATES PATENTS

| | | | |
|---|---|---|---|
| 3,114,386 | 12/1963 | Dumm | 251/315 X |
| 3,214,135 | 10/1965 | Hartmann | 251/315 |
| 3,455,534 | 7/1969 | Scaramucci | 251/315 X |
| 3,617,025 | 11/1971 | Gerbic et al. | 251/315 X |
| 3,722,859 | 3/1973 | Murphy et al. | 251/315 |

*Primary Examiner*—Henry T. Klinksiek
*Attorney, Agent, or Firm*—W. F. Hyer; Marvin B. Eickenroht

[57] ABSTRACT

A ball valve having seats which have substantially spherical opposite ends which, when the seats are in seated position, engage a ball closure mounted within a chamber of the valve body and substantially spherical seating surfaces in the chamber surrounding the intersection of the inlet or outlet therewith. The ends of the seats and the seating surfaces are concentric with the ball closure to permit the seats to be slid within spaces between the closure and the wall of the chamber between seated position and a position generally aligned with an opening into the valve body through which both the ball closure and the seats may be passed.

2 Claims, 15 Drawing Figures

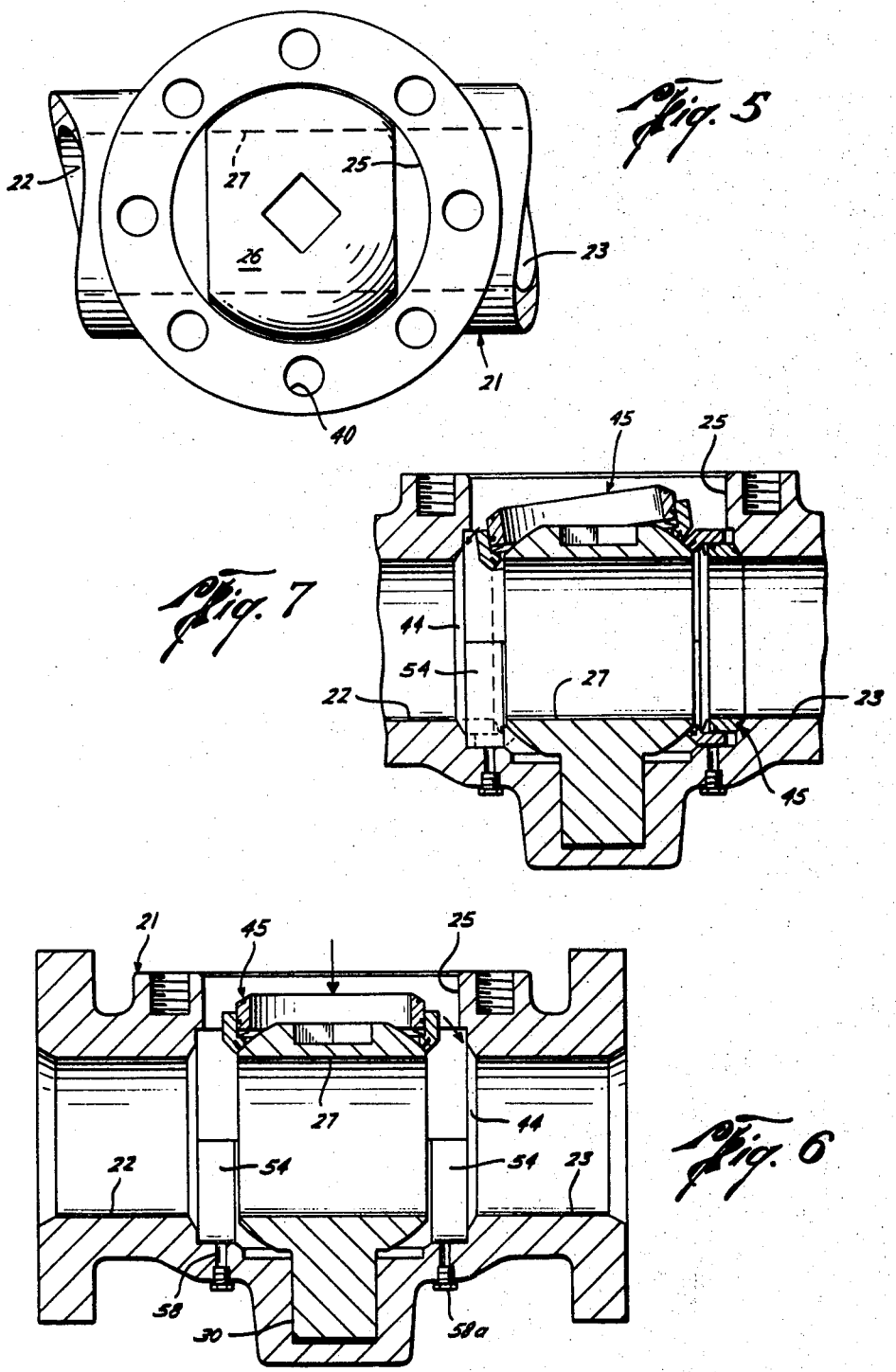

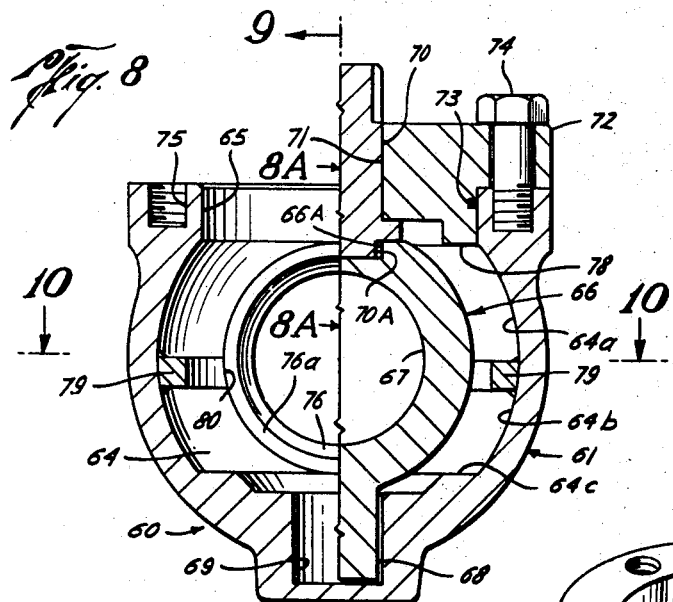
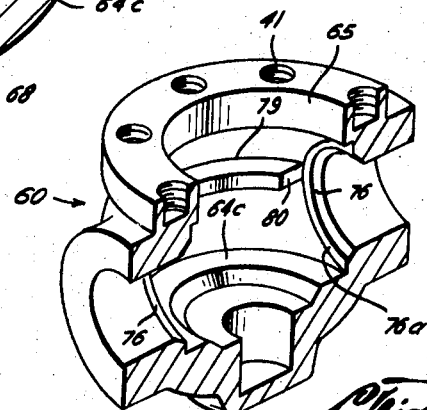
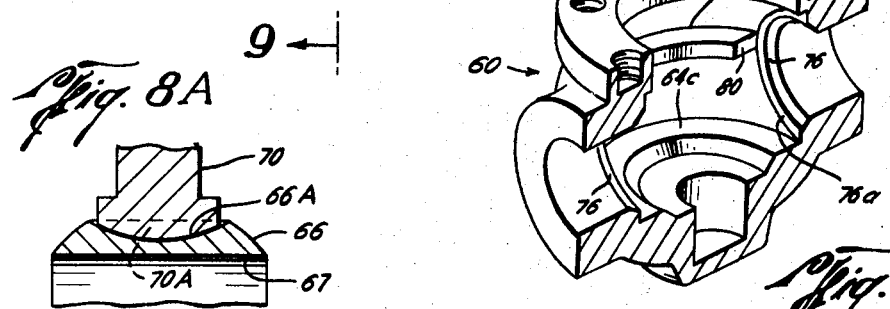
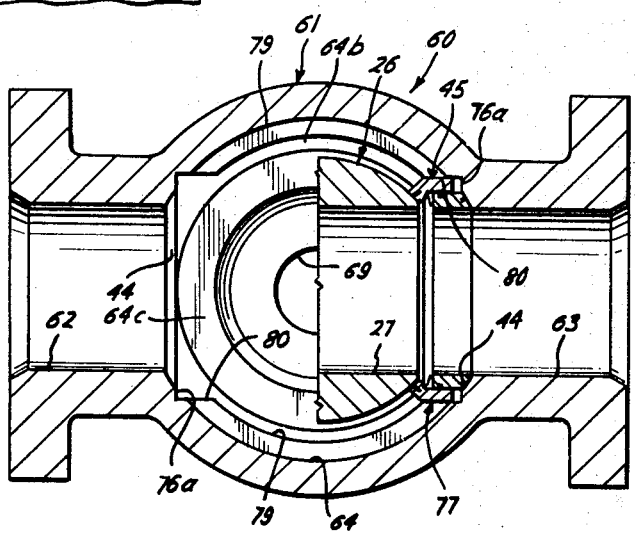

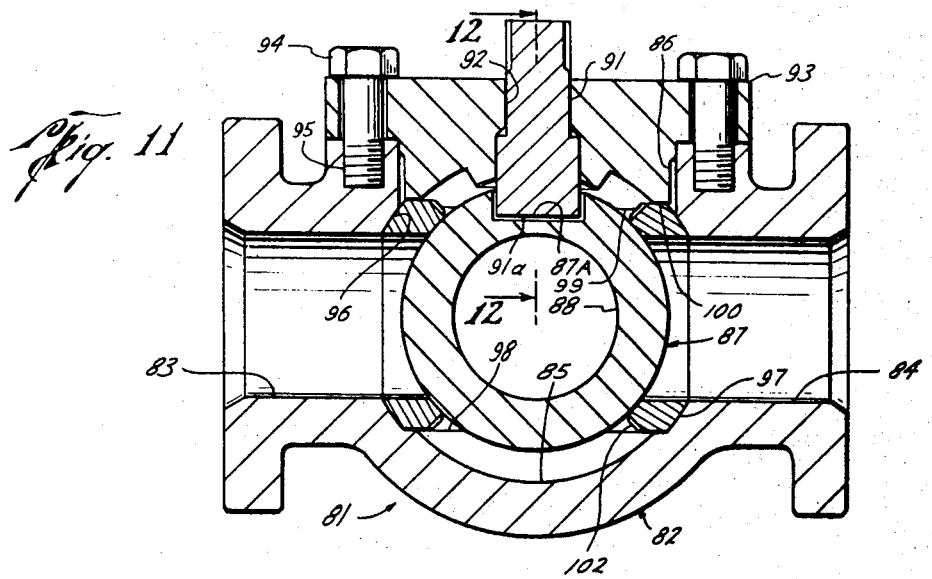
Fig. 11
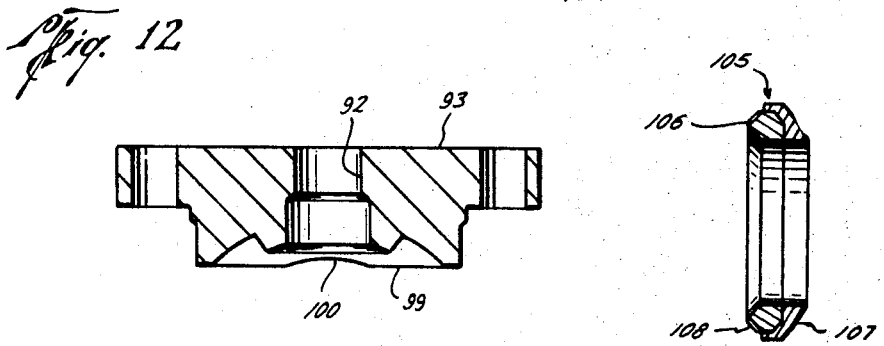
Fig. 12
Fig. 14
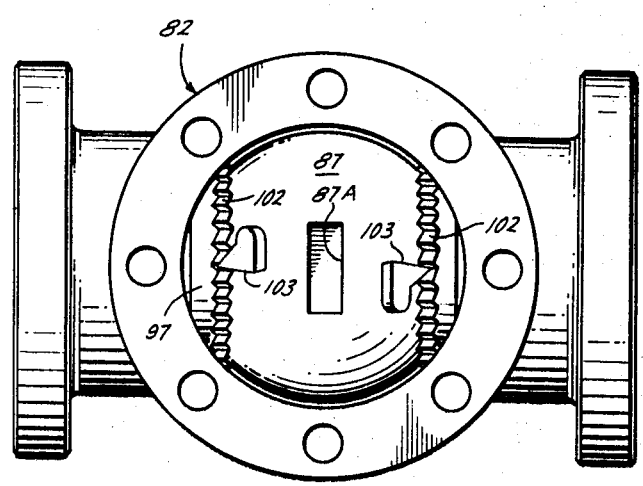
Fig. 13

BALL VALVE

This is a division of application Ser. No. 181,354, filed on Sept. 17, 1971, by Herbert Allen, and entitled "Ball Valve," which is a continuation-in-part of application Ser. No. 148,699, filed June 1, 1971, by Herbert Allen, entitled "Ball Valve," and both now abandoned.

This invention relates generally to ball valves, and, more particularly, to improvements in ball valves of the type having a ball closure and one or more separate seats movable through an access opening connecting the exterior of the valve body with a chamber within the valve body. Thus, upon removal of a bonnet closing the opening, the closure and seats may be installed in or removed from seated positions between seating surfaces surrounding the inlet and outlet within the chamber.

In some so-called "top entry" valves of this type, the ball closure and seats are moved through the access opening as an assembled unit. However, this requires a relatively large access opening, which in turn requires a large and heavy bonnet for sealably closing it to contain pressure within the valve.

In other valves of this type, the seats are moved through the access opening separately of the ball closure, whereby they are installed before and removed subsequent to the ball closure. Although this permits a smaller access opening, it nevertheless requires that the seats comprise telescoping tubular parts which are spring-pressed to the extent necessary to permit them to be collapsed to permit the ball closure to be moved into and out of position between them and then, with the closure therebetween, extended for engaging at opposite ends with the closure and the seating surfaces in the valve body. It has been found that the springs which must be collapsed to this extent do not provide enough force, when extended, to engage the ball closure and seating surfaces sufficiently tightly to maintain a good seal therewith.

Still other valves of this type have ball closures having a relatively thin dimension which permit them to be turned into position for movement between relatively non-collapsible seats within the chamber and then rotated into seated position therebetween. Although these valves do not require seats with any great degree of extendibility, the need for rotating the closure after insertion between the seats complicates the manner in which stems may be mounted to opposite sides of the closure, which mounting may be desirable in order to position the closure in the valve body, and, in some cases, to reduce the torque for operating the closure.

An object of this invention is to provide a valve of this type in which the access opening need by only slightly larger than the ball closure, in which the seats are of such construction as to maintain a tight seal between the closure and valve body, and in which stems may be mounted with respect to opposite sides of the closure in a relatively simple manner.

Another object is to provide such a valve in which the seats are firmly held in proper seated position.

A further object is to provide such a valve which is relatively easy and inexpensive to fabricate.

Yet another object is to provide a seat which is particularly well suited for use in such a valve.

These and other objects are accomplished, in accordance with the illustrated embodiments of the invention, by a valve in which the seating surface on the valve body surrounding one or each of the inlet and outlet within the chamber of the valve body, as well as the inner and outer ends of the seat engaged between the closure and seating surface are substantially spherical. More particularly, these substantially spherical surfaces are generally concentric with the ball closure, and thus with one another, and at least the portion of the wall of said chamber intermediate the access opening into the chamber and the side of each said seating surface nearest said opening is spaced from said closure a distance which permits the seat to be moved between them. Thus, when the bonnet for closing the opening is removed from the opening, the seats may be moved between seated position and a position generally aligned with said opening for movement therethrough, whereby each seat may be installed in or removed from seated position without disturbing the ball closure. When the bonnet is connected to the valve body to close the access opening, it provides surfaces which cooperate with surfaces on the valve body chamber to prevent movement of each seat out of its seated position.

In this novel valve construction, the access opening may be, and preferably is, just slightly larger than the closure. Also, the seats may be of a relatively fixed end-to-end dimension, and in any event, need be extendible only to the extent required to cause their ends to engage between the ball closure and seating surface with enough force to form an initial seal. Still further, the ball closure may be of almost any side-to-side dimension since it need not move into and out of position between the seats, and stems may be mounted in a simple manner with respect to opposite sides of the ball closure since the stem between the top side of the ball closure and the bonnet is removable upon removal of the bonnet itself to a position permitting each seat to be moved into and out of position generally aligned with the access opening.

In the preferred and illustrated embodiments of the invention, the portion of the chamber wall past which each seat slides is curved spherically to substantially the same radius as the seating surface with which one end of the seat engages. This not only reduces the size of this portion of the valve body, but also simplifies its fabrication, and particularly the chamber within it. It is further preferred that the entire wall of at least the half of the chamber wall surrounding the access opening be curved spherically to substantially the same radius as the seating surfaces, because this still further reduces the size and facilitates fabrication of the valve body.

In the drawings, wherein like reference characters are used throughout to designate like parts:

FIG. 5 is a top view of the valve, as seen along broken line 5—5 of FIG. 4;

FIG. 6 is a view of the valve similar to FIG. 4, but upon movement of one of the seats into a position aligned with the access opening and resting upon the top of the ball closure;

FIG. 7 is a view of the valve similar to FIG. 6, but with one seat swung 90° into seated position between the right side of the ball closure and the oppositely facing seating surface in the chamber of the valve body; and the other seat resting upon the top of the ball closure prior to its movement into position between the left side of the ball closure and the other seating surface of the chamber of the valve body;

FIG. 8 is a vertical sectional view of a valve constructed in accordance with another embodiment of the invention, with the left side of the ball closure and seat behind it removed from within the chamber of the valve body;

FIG. 8A is a vertical sectional view of an upper portion of the valve of FIG. 8, as seen along broken line 8A—8A of FIG. 8;

FIG. 9 is a perspective view of a section of the valve body of the valve of FIG. 8, with the ball closure and seats removed therefrom, and as seen along broken line 9—9 of FIG. 8;

FIG. 10 is a horizontal sectional view of the valve of FIGS. 8 and 9, as seen along broken line 10—10 of FIG. 8 thereof, and with the closure member and seat on the left side thereof removed for purposes of illustration;

FIG. 11 is a vertical sectional view of a valve constructed in accordance with still another embodiment of the invention;

FIG. 12 is a view of the bonnet of the valve of FIG. 11, with the stem removed therefrom, and as seen along broken line 12—12 of FIG. 11;

FIG. 13 is a top plan view of the valve of FIGS. 11 and 12, with the bonnet removed; and FIG. 14 is a vertical sectional view of an alternative valve seat.

Figure 1:
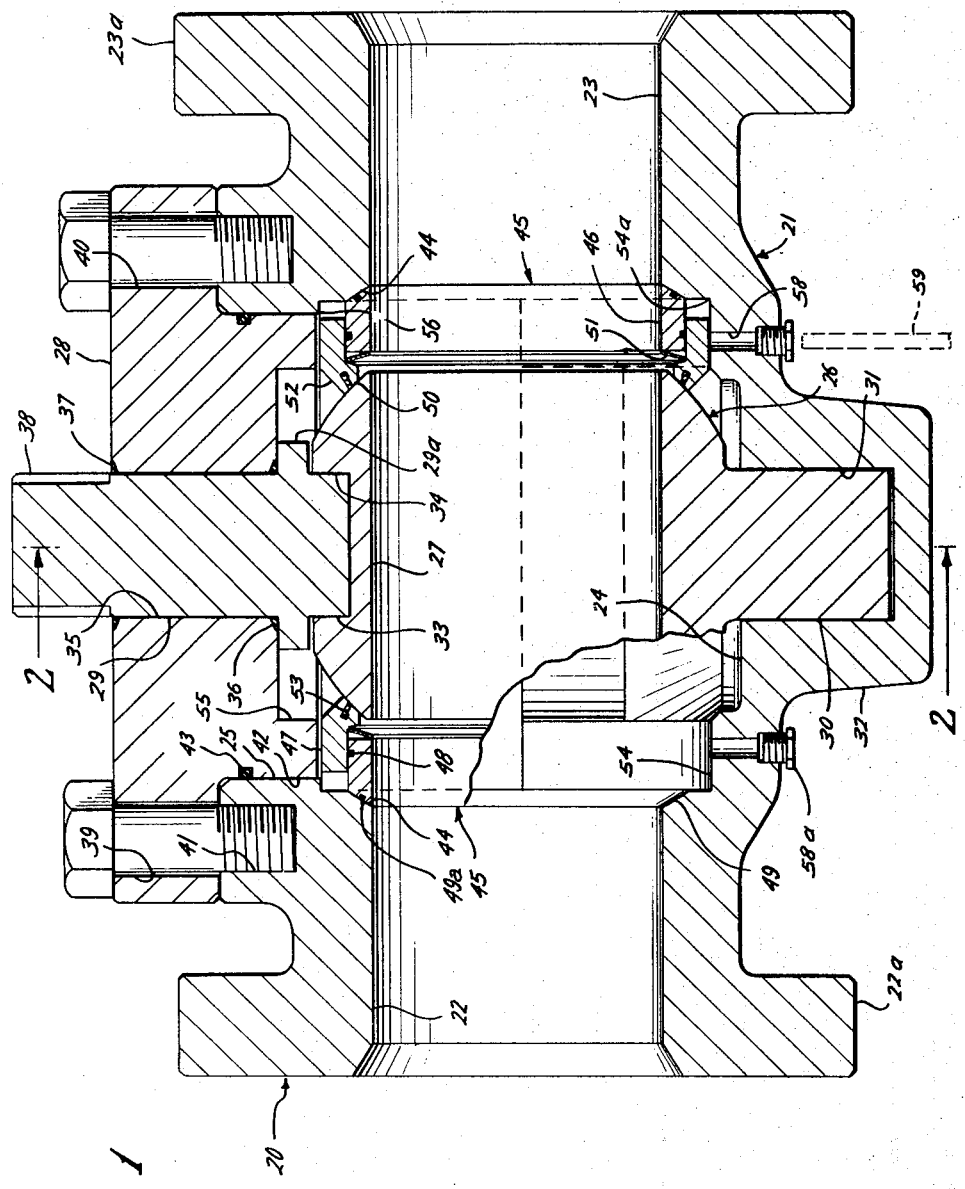
FIG. 1 is a longitudinal cross-sectional view of a valve constructed in accordance with one embodiment of the invention, a portion of the ball closure and one of the seats being shown in elevation.

With reference now to the details of the above-described drawings, the valve illustrated in FIGS. 1 to 7, and indicated in its entirety by reference character 20, comprises a valve body 21 having an inlet 22 at one end and an outlet 23 at its other end (assuming flow from left to right in FIG. 1). An enlarged chamber 24 in the valve body intersects the inlet and outlet, and a cylindrical opening 25 connects the exterior of the valve body with the enlarged chamber 24 to provide access to and from the chamber. For the purposes of this description, it will be assumed that the opening 25 is in the top side of the valve body.

As shown, inlet 22 and outlet 23 are axially aligned, and the axis of opening 25 is perpendicular thereto. As will be understood from the description to follow, chamber 24 is generally symmetrical end for end and side for side. Flanges 22a and 23a surrounding the inlet and outlet, respectively, of the valve body, provide a means by which the valve may be connected within a pipeline.

A ball closure 26 is mounted within the valve body chamber for rotation about the axis of access opening 25. The closure has a port 27 therethrough of the same diameter as the inlet and outlet, so that upon rotation of the ball closure, it is moved between a position aligned with the inlet and outlet for opening the valve and a position disposed perpendicularly to the inlet and outlet for closing the valve.

A bonnet 28 is connected to the valve body for closing the access opening 25, and the ball closure 26 is rotatably mounted within the valve body by means of an upper stem 29 supported by bonnet 28 and a lower stem 30 mounted in the bottom of the valve body. As shown, the stems are axially aligned on the axis of access opening 25. The lower stem 30 is fixed to the bottom side of the ball closure, for positioning same in the body, and is journalled within a recess 31 formed in a depending portion 32 of the bottom of the valve body.

The upper stem 29 is carried by the bonnet 28 for removal therewith and has a lower non-circular end 33 which is closely received within a correspondingly shaped recess 34 in the top side of the ball closure. Thus, an intermediate portion of stem 29 extends through a hole 35 in the bonnet for rotation therein and is held thereon by a flange 29a about its lower end and a part of a rotary operator (not shown) which is adapted to connect with splines 38 on the upper end of the stem. Seal rings 36 and 37 are carried by the bonnet at opposite ends of the hole 35 for sealing about the stem 29 as it is rotated, the lower ring being retained by flange 29a and the upper ring being retained by the part of the operator connected to splines 38.

The bonnet 28 is removably connected across the access opening 25 by studs 39 which extend through holes 40 in an annular flange about the central portion 42 of the bonnet for threaded connection to sockets 41 about the portion of the top side of the valve body 21 which surrounds the access opening 25. When the bonnet is so connected, its central portion is received closely within the access opening 25 so that a seal ring 43 carried about the central portion seals against the opening and thus contains pressure within the valve body. There is a small clearance between the bottom of flange 29a and the top of ball closure 26 to permit the closure to float to a limited extent in a vertical direction.

A seating surface 44 is provided on each side of the valve body chamber 24 to surround the intersection of each of the inlet and outlet with the chamber. Each such seating surface is substantially spherical and concentric with the outer surface of the ball closure 26. As best shown in FIG. 1, an annular seat 45 is seated between each seating surface and the oppositely facing side of the closure so that the opening through it is axially aligned with the adjacent inlet or outlet, and thus with the port 27 when the closure is in open position. More particularly, the ends of the seats are sealably engaged between the closure and seating surface so that, with the closure in open position, line fluid is confined to passage from the inlet to the ball and seats into the outlet 23, and with the ball closure in closed position, the upstream seat prevents flow from the inlet into the chamber 24.

Each seat comprises an inner ring 46, an outer ring 47 axially slidable with respect to the inner ring, and an O-ring 48 carried about the outer diameter of the inner ring to form a sliding seal between the inner and outer rings. The outer end 49 of the inner ring engages the seating surface 44, and the inner end 50 of the outer ring engages the ball closure 26. More particularly, the inner and outer ends 49 and 50 of the seat are substantially spherical and concentric with the outer surface of the closure member, and thus with the seating surface 44 which such outer end engages. An O-ring 49a is carried on the outer end 49 of each inner seat ring 46 for sealing between it and the oppositely facing seating surface 44.

It will be understood in this respect that the description of the seating surfaces on the valve body as well as the ends of the seats as "substantially spherical" contemplates some departure from an absolutely spherical surface. For example, it is actually preferred that the seating surfaces 44 be conical so as to have line contact with the spherical outer ends of the seats. This not only enhances sealing engagement between the seat and seating surface, but also facilitates sliding of the outer end of the seat into and out of the seated positions of FIG. 1, as will be described below. Thus, as used herein, the term "substantially spherical" should be taken in the context of the small difference between a spherical and a conical surface when formed about a relatively large radius.

As shown in the drawings, a Bellville spring 51 or the like is disposed between the inner end of the inner ring 46 and a radially inwardly enlarged head 52 on the inner end of the outer ring of each seat, so as to urge the ends of the seat into sealing contact with the closure and seating surface. It will be understood, however, that since the principal function of the spring 51 is merely to create an initial contact between the ends of the seat and adjacent seating surfaces on the valve body and ball closure, the spring expands only to a small extent so that it loses only an insignificant portion of its spring rate. Also, a ring 53 of suitable sealing material is carried by the head on the inner end of the ring 47 to provide a compressible seal against closure 26. Thus, it's also contemplated that the inner end 50 of each seat may also be more of a conical than a strictly spherical shape so as to provide narrow contact with the ball closure.

It will be understood that the substantially spherical seating surfaces between the seats and the closure member and seating surfaces enables the seats to swing to a limited extent for self-alignment, and thus to accommodate tolerances in the machining of such surfaces. It will also be understood that the limited ability of the closure itself to float in a vertical direction will contribute toward this ability of the seats to adjust.

As previously described, and as will be understood from the drawings, the portion of the wall of the chamber 24 intermediate the access opening 25 and the side of each seating surface 44 nearest the access opening is spaced from the oppositely facing surface of the closure a distance at least as great as the distance between the ball closure and the oppositely facing seating surface 44. Thus, upon removal of the bonnet 28 and the upper stem 29 from within the access opening, each seat may be slid between the closure and such wall portion between the seated position shown in FIGS. 1 and 7 and a position substantially axially aligned with the access opening as shown in each of FIGS. 6 and 7. More particularly, and as will be described more fully below, at least this portion of the chamber wall, and preferably the entire upper half 24a of such wall, is curved spherically to at least the same radius as the seating surface adjacent thereto, so that it provides the required space for movement of the seat while at the time maintaining the internal dimensions of the valve body chamber to a minimum.

As also previously described, movement of each seat out of seated position between the closure and seating surface is limited by surfaces on the bonnet and on the valve body within the chamber which are disposed opposite all four sides of each seat. For this purpose, a semi-cylindrical recess 54 is formed in the lower side of the valve body chamber about the radially outer edge of each seating surface 44 so as to support the lower half of the outer periphery of the seat engaged with such surface. More particularly, each recess 54 is radially outwardly enlarged and concentric with such seating surface 44 and of substantially the same diameter as the outer periphery of the seat received therein, so as to locate the seat with the opening therethrough aligned with the inlet or outlet and the port 27 through the ball closure in the open position thereof.

Figure 2:
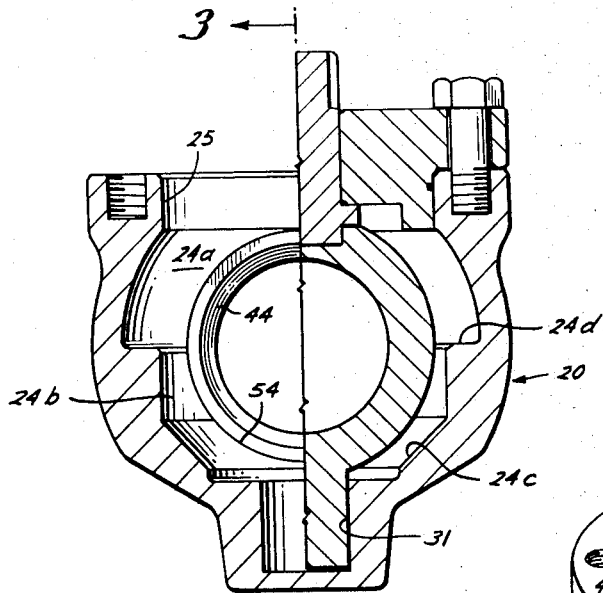
FIG. 2 is a cross-sectional view of the valve of FIG. 1, on a reduced scale and as seen along broken line 2—2 of FIG. 1, but with the ball closure and seat removed from the lefthand portion thereof for illustrative purposes.

As shown in FIGS. 1 and 2, the central portion 42 of the bonnet 28 has a depending rim 55 about its outer diameter whose lower side is disposed near the top side of each seat 45 when the bonnet is closed and the seat is in seated position. This surface of the bonnet therefore limits upward and inward swinging of each seat about the outer surface of the ball closure.

Figure 3:
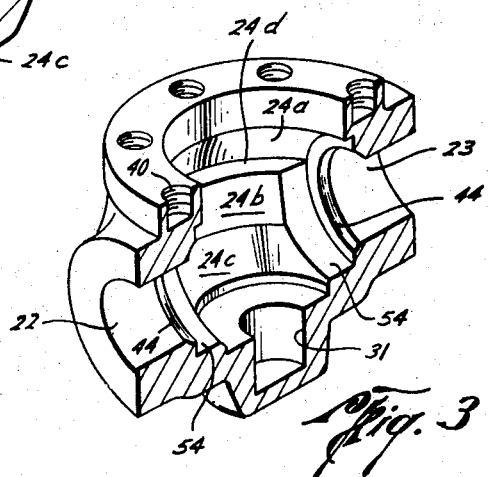
FIG. 3 is a perspective view of a section of the valve body of the valve of FIGS. 1 and 2, as seen along broken line 3—3 of FIG. 2.

As best shown in FIGS. 2 and 3, the wall of the lower half of the chamber includes an upper cylindrical portion 24b of a diameter to be closed to, but not interfere with, the outer surface of the ball closure. The wall portion 24b is preferably of the same diameter as and axially aligned with that of the access opening 25. A lower portion 24c of the lower half of the chamber wall is conical and tapers inwardly and downwardly from the lower edge of the cylindrical wall portion 24b, so as to be close to but not interfere with the ball closure. This surface may be formed with the same tool that forms the access opening 25 and wall portion 24b.

As will also be apparent from FIGS. 2 and 3, the spherical wall portion 24a of the valve body chamber may be formed subsequently to the cylindrical hole by means of a suitable enlarging tool passed through the access opening 25. This results in a laterally extending ledge 24d of the chamber at the intersection of the wall portions 24a and 24b. As shown in FIG. 3, the semi-cylindrical recess 54 disposed about the lower half of each seating surface 44 intersects at its upper edges with the ledge 24d and may be formed by the insertion of a suitable enlarging tool through either the inlet or outlet about which it is formed. This machining operation not only forms the recess, but also removes a portion of the spherical wall portion 24b in the upper half of the chamber to form a notch 54a.

In a further machining step in the fabrication of the valve body, a suitable tool is passed through the inlet and outlet for machining the surface 44. The upper half of this surface has of course already been partially formed upon formation of the spherical wall portion 24a. Thus, the main purpose of this further machining step is to form the lower half of each surface 44.

As shown in FIG. 5, the diameter of the ball closure 26 is just slightly smaller than the diameter of the access opening 25 so as to permit its passage therethrough. Of course, since the seats 45 are of smaller outer diameter than the closure, they pass freely through the access opening. Thus, the access opening, and consequently the force required to maintain the bonnet closed, is kept to a minimum.

Figure 4:
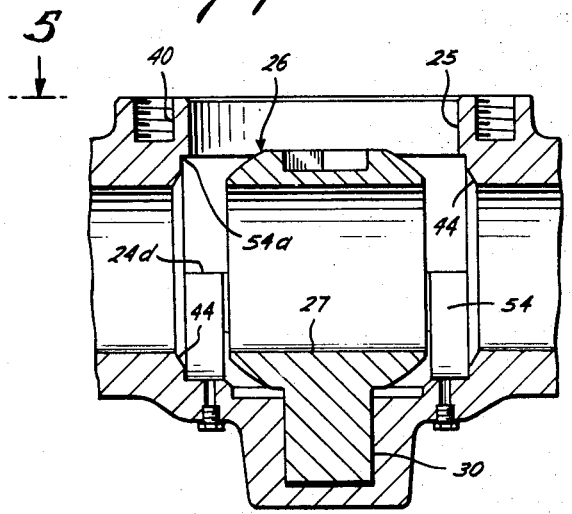
FIG. 4 is a longitudinal sectional view of the valve of FIGS. 1 to 3, with the seats, bonnet, and upper stem removed therefrom.

The manner in which the ball valve 20 is assembled is illustrated sequentially in FIGS. 4 to 7. Thus, as shown in FIG. 4, with the bonnet 28 removed, the ball closure 26 is moved downwardly through the access opening 25, so as to insert its lower stem 30 into the stem recess 31. When the stem is seated in the recess, the closure is located concentrically within the chamber. A seat 45 is then moved through the access opening 25 so as to bring its inner end 50 into engagement with the top side of the ball closure, where it is supported generally axially of such opening. At this time, the seat may be caused to slide about the closure member, as indicated by the arrow in FIG. 6, and thus within the space between it and the oppositely facing portion 24a of the chamber wall intermediate the access opening and the top portion of the seating surface 44 about outlet 23. During this time, the seat may be held in a slightly collapsed position so as to insure that its outer end slides easily past the inner wall portion 24a.

As illustrated in FIG. 7, the seat is so moved until it reaches seated position, at which time its lower half engages with the recess 54. The opposite upper edges of the recess will guide the bottom half of the seat into the recess. The second seat is similarly installed, as also indicated in FIG. 7.

The bonnet 28 is then moved over the access opening 25 and its central portion 42 is slid into the access opening 25. This causes the lower non-circular end of the stem 29 to move into the similarly shaped recess 34 in the top of the ball closure, and the seal ring 43 to move into sealing engagement with opening 25. When the bonnet is thus moved the full distance, as determined by the engagement of its flange with the top of the valve body, studs 39 are made up with threaded sockets 41 in the valve body. As previously described, and as shown in FIG. 1, connection of the bonnet to the valve body in this manner locates the lower side of its rim 55 in position for limiting sliding of the seat upwardly and inwardly from seated position.

Disassembly of the valve involves an obvious reversal of the above-described procedure. As shown in FIG. 1, a hole 58 in the valve body intersects the bottom of each recess 54 to receive a rod 59 (broken lines) to be inserted therethrough for facilitating upward sliding of each seat 45 out of seating position. Normally, each hole is closed by a plug 58a.

The valve illustrated in FIGS. 8 to 10, and indicated in its entirety by reference character 60, is similar in many respects to the valve 20. Thus, it comprises a valve body 61 having an inlet 62 thereto and an outlet 63 therefrom, an enlarged chamber 64 intersecting the inlet and outlet, and a cylindrical access opening 65 connecting the exterior of the top side of the body with the top of the chamber. The inlet and outlet are axially aligned and adapted to be connected in flow communication with a pipeline by means of flanges or the like on the ends of the body, the axis of opening 65 is perpendicular to the axes of the inlet and outlet, and the chamber 64 is generally symmetrical end for end and side for side.

A ball closure 66 having a port 67 is mounted concentrically within the valve body chamber for rotation between opened and closed positions in which the port is selectively aligned and disaligned, respectively, with the inlet and outlet. As in the case of the ball closure 26, the ball closure 66 has a lower stem 68 which is arranged within a recess 69 at the bottom of the valve body, and an upper stem 70 which is journalled within a hole 71 through a bonnet 72 for closing the access opening 65 has a non-circular lower end 70A which is removably insertable into a slot 66A in the top of the ball closure for imparting rotation thereto.

As in the case of valve 20, stems 68 and 70 are coaxial of access opening 65. However, as distinguished therefrom, the stems are so arranged that when the ball closure 66 is in open position, it may float in a direction axially of the inlet and outlet of the valve body. Thus, as shown in FIG. 8A, the slot 66a is longer than the end 70A of stem 70 in a direction axially of the port 67 through the ball closure, and, as shown in FIG. 8, stem 68 fits loosely within the recess 69. In this latter respect, stem 68 serves to position the ball closure by limiting its swinging about an axis transverse to the axes of the inlet and outlet when the ball closure is in the closed position of FIG. 8A.

The bonnet 72 is similar to the bonnet 28 of the valve 20 in that it has a central portion which fits closely within access opening 65 and carries a seal ring 73 for sealably closing the access opening. Also, the bonnet is removably connected to the valve body by studs 74 received in threaded sockets 75 in the portion of the top of the valve body surrounding the access opening 65.

Also, substantially spherically shaped seating surfaces 76 surround the inner end of each of the inlet and outlet concentrically of the ball closure, and seats 77 are located in seated position between the opposite sides of the ball closure and each seating surface 76. More particularly, each of the seats 77 is identical in construction to the seats 45, and thus comprises inner and outer axially slidable tubular parts having inner and outer ends which are substantially spherically shaped concentrically of the ball closure, and thus concentrically with respect to the seat surface 76.

The valve body 61 of the valve 60 differs from that of the valve 20 in that both the top half 64a of the chamber wall as well as the upper portion 64b of the lower half thereof are curved spherically and concentrically with respect to the outer surface of the ball closure 66. Thus, as best shown in FIG. 8, most of the inner wall of the chamber 64 is disposed relatively closely to, but not so as to interfere with, the outer surface of the ball closure 66. More particularly, wall portions 64a and 64b are curved to substantially the same radius as seating surfaces 76 so as to provide a space about most of the ball closure not substantially greater than the space required for passage of the seats.

As shown in FIGS. 9 and 10, the outer edge of each seating surface 76 is joined to the spherical walls 64a and 64b by an annular surface 76a lying in a plane perpendicular to the axes of the inlet and outlet. This in effect forms an annular notch 76b at the outward extension of the outer cylindrical surface of each seat.

A lower flat surface 64c of the bottom half of chamber 64 extends perpendicularly to the axis of rotation of the ball closure and lies in a plane which passes through the lower edges of the annular surfaces 76a surrounding the seating surfaces 76. Thus, surface 64c engages the lower edge of each seat 77 so as to locate it against downward movement out of seated position. Similarly to the valve 20, the bonnet 72 has a rim 78 about the lower side of its central portion and adjacent its lower outer diameter which is adapted to limit sliding of the seat upwardly about the ball closure.

As shown in FIGS. 9 and 10, ribs 79 extend about a midportion of the chamber 64 and on opposite sides of each of the inlet and outlet to provide shoulders 80 at their ends which are generally in vertical planes near the outer edges of the annular shoulders 76a about the seating surfaces 76. Thus, as will best be understood from FIG. 10, the shoulders 80 are close to the opposite sides of the seats 77 so as to limit their lateral movement out of seated position.

The assembly and disassembly of the valve 60 will also be apparent from the description of the assembly of the valve 20, and thus need not be described in detail.

The valve illustrated in FIGS. 11 to 13, indicated in its entirety by reference character 81, is similar in many respects to the valves 20 and 60. Thus it comprises a valve body 82 having an inlet 83 thereto and an outlet 84 therefrom, an enlarged chamber 85 intersecting the inlet and outlet, and a cylindrical access opening 86 connecting the exterior of the top side of the body with the top of the chamber. As illustrated, the inlet and outlet are axially aligned and adapted to be connected in fluid communication with a pipeline by means of flanges or the like on the ends of the body. Also, the axis of access opening 86 is perpendicular to the axes of the inlet and outlet, and chamber 85 is centered at the intersecting axes of the inlet and outlet and the opening 86 and is symmetrical end for end and side for side of the body.

A ball closure 87 having a port 88 therethrough is mounted concentrically within chamber 85 for rotation between open and closed positions in which the port is aligned and disaligned, respectively, with the inlet and outlet of the body. Similarly to the previously described valves, an upper stem 91 journaled within a hole 92 through a bonnet 93 which is adapted to close the access opening 86 has a lower end 91a which is elongated and fits within a slot 87A across the top of the closure member. Thus, the outer end of the stem may be rotated by any suitable means (not shown) in order to impart rotation to the ball closure 87. As will be apparent from FIG. 11, the stem 91 is coaxial of access opening 86 so that the ball closure rotates about the axis of the access opening. However, as distinguished from the previously described valves, there is no stem connected to the lower end of the ball closure.

The lower end 91a of stem 91, and thus the slot 87A in the top of the ball closure, extend in a direction transverse to the port 88 in the ball closure, and the width of the slot fits the lower end 91a of the stem closely. However, the slot 87A is slightly longer than the lower end of the stem to permit the ball closure to float axially of the inlet and outlet when the ball closure is in the closed position of FIG. 11, and thereby facilitate tight seating between the downstream seat and each of the ball closure and valve body in such closed position of the valve.

The bonnet 93 is similar to the bonnets of the previously described valves in that it has a lower central portion which fits closely within access opening 86. It may also carry a suitable sealing means (not shown) for sealing either with respect to the access opening 86 or the top side of the valve body. As shown in FIG. 11, the bonnet is removably connected to the valve body by studs 94 received in threaded sockets 95 in the top side thereof.

The valve body 82 has spherically shaped seating surfaces 96 in the chamber which surround the inner end of each of the inlet and outlet concentrically of the ball closure 87, and seats 97 are located in seated position between the opposite sides of the ball closure and each such seating surface. Each of the seats 97 differs from the seats of the previously described valves in that it is made of one piece, although, as in the case of the previously described seats, each seat 97 has innner and outer ends which are substantially spherically shaped concentrically of the ball closure, and thus concentrically with respect to the seating surface 96.

As in the case of the valve body of the valve 60, the valve body chamber has walls about its top half as well as about the upper portion of its bottom half which are curved spherically and concentrically with respect to the ball closure 87. More particularly, and as will be understood from the description of the valve 60, these inner walls of the chamber are curved to substantially the same radius as the seating surfaces 96 so as to provide a space between the ball closure and chamber wall which is not substantially greater than the space required for passage of the seat 97 between its seated position and a position generally aligned with the access opening.

There is a lower flat surface 98 in the valve body chamber which forms a ledge at the lower end of the upper portion of the lower half of the chamber. This ledge extends perpendicularly to the axis of rotation of the ball closure and lies in the plane which passes through the lower edges of the body sealing surfaces 96. Thus, the ledge 98 engages the lower edge of each seat 97 so as to locate it against downward movement out of seated position.

Also, and similarly to the previously described valves, the bonnet 93 has a rim 99 about its lower depending portion which is adapted to engage the upper surfaces of the seats 97 and thus limit their sliding upwardly about the ball closure. However, in the valve 81, the portions 100 of the rim which engage the seats are scalloped to approximately the radius of the seats so as to limit their lateral movement out of seated position. Thus, the scalloped portions are disposed on opposite sides of the rim and properly located about the axis of opening 96 by any suitable means, such as the alignment of bolt holes in the bonnet with predetermined threaded recesses 95 in the valve body.

The valve 81 also has means for rotating each of the seats 97 about its axis and between different rotational positions. More particularly, this means is so arranged and constructed as to cause such rotation automatically in response to operation of the valve. For this purpose, each seat is provided with a circle of teeth 102 about its periphery, and dogs 103 are pivotally mounted on the ball closure for swinging into and out of engagement with the teeth during movement of the ball closure between the open and closed positions.

As will be apparent from FIG. 13, the dogs 103 are so arranged as to move into engagement with the teeth as the ball closure moves into open position. The teeth are of a ratchet-type with their abrupt sides facing the dogs so that engagement of the dogs with the teeth during movement of the ball closure to open position will cause the dogs to follow the teeth and thus rotate the seats. However, the dogs are pivotally mounted on the ball closure, so that as the ball closure returns to closed position, the dogs will merely slide over the back sides of the teeth and thereby not return the seats to their previous positions.

Attention is respectfully invited to prior U.S. Pat. No. 3,157,190 for a more detailed description of the construction and operation of this seat rotating mechanism. As disclosed in the prior patent, each of the dogs 103 is removably insertable into holes (not shown) on the top side of the ball closure. Thus, the dogs 103 may be removed from mounted position on the ball closure as each of the seats 97 is moved into position generally aligned with the opening 86 during insertion or removal. Then, of course, upon disposal of the seats in seated position, the dogs 103 may be pivotally mounted in the holes and thus disposed in position for rotating the seats in the manner described. The assembly and disassembly of the valve 81, and particularly the seats 97 thereof, will thus be apparent from the description of the assemblies of the valves 20 and 60.

The seat 105 shown in FIG. 14 differs from the seat 97 in that it is formed of separate, inner and outer parts 106 and 107. It also differs from the two-piece seats of the valves 20 and 60 in that the seat parts are not yieldably pressed apart, but instead are nested within one another to provide a fixed dimension between the inner spherical surface on the free end of part 106 and the outer spherical surface on the free end of part 107. Thus, as in the case of the seat 97, these surfaces are concentric of one another for fitting between the ball closure 87 and valve body surface 96 of the valve 81.

Teeth 108 are formed about the periphery of the inner part 106 for engagement by the dogs 103. Preferably, this part is made of a highly wear-resistant material such as cast tungsten carbide. Also, there may be some slight clearance between the inner and outer parts to permit the inner part to rotate relative to the outer, whereby the outer part, and its spherical surface may be made of less wear-resistant material.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A seat for a valve having a body and a ball closure, comprising radially inner and outer relatively axially slidable rings, means providing a seal between the rings, means yieldably urging the rings axially apart, one of said rings having an end surface adapted to engage the body, the other ring having an end surface adapted to engage the closure, said surfaces being substantially spherical and substantially concentric, and a seal carried on each said surface.

2. A seat of the character defined in claim 1, wherein said one ring is the radially inner ring.

* * * * *

PO-1050
(5/69)

UNITED STATES PATENT OFFICE
CERTIFICATE OF CORRECTION

Patent No. 3,830,465  Dated August 20, 1974

Inventor(s) Herbert Allen

It is certified that error appears in the above-identified patent and that said Letters Patent are hereby corrected as shown below:

On the cover page, line 9, cancel "abandoned, which is" and insert --now Patent No. 3,771,545, issued November 13, 1973, which was--.

Column 1, line 5, after "Ball Valve," insert --now Patent No. 3,771,434,--; line 5, change "is" to --was--; line 7, cancel "both".

Signed and sealed this 3rd day of December 1974.

(SEAL)
Attest:

McCOY M. GIBSON JR.
Attesting Officer

C. MARSHALL DANN
Commissioner of Patents